United States Patent Office 3,515,028
Patented June 2, 1970

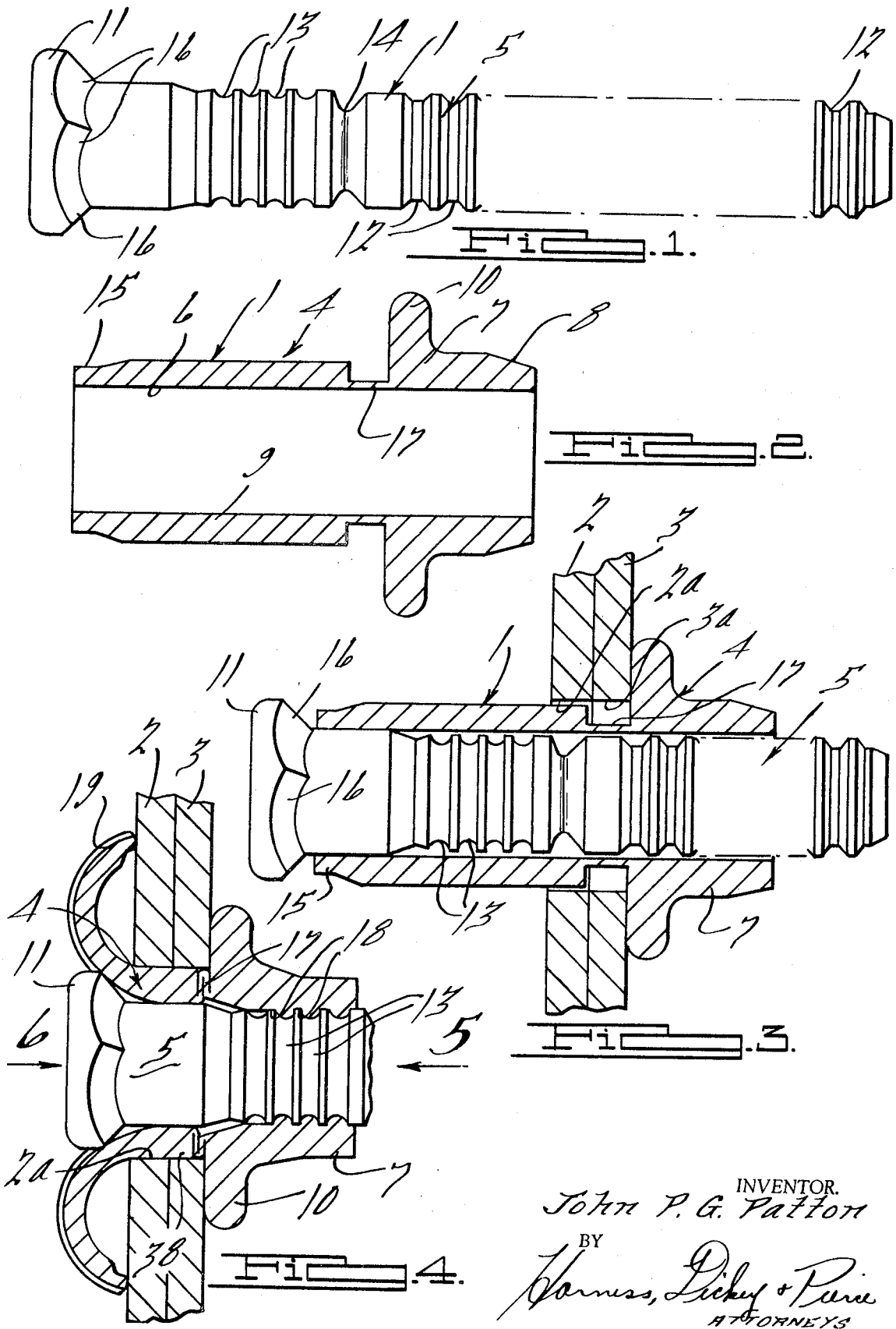

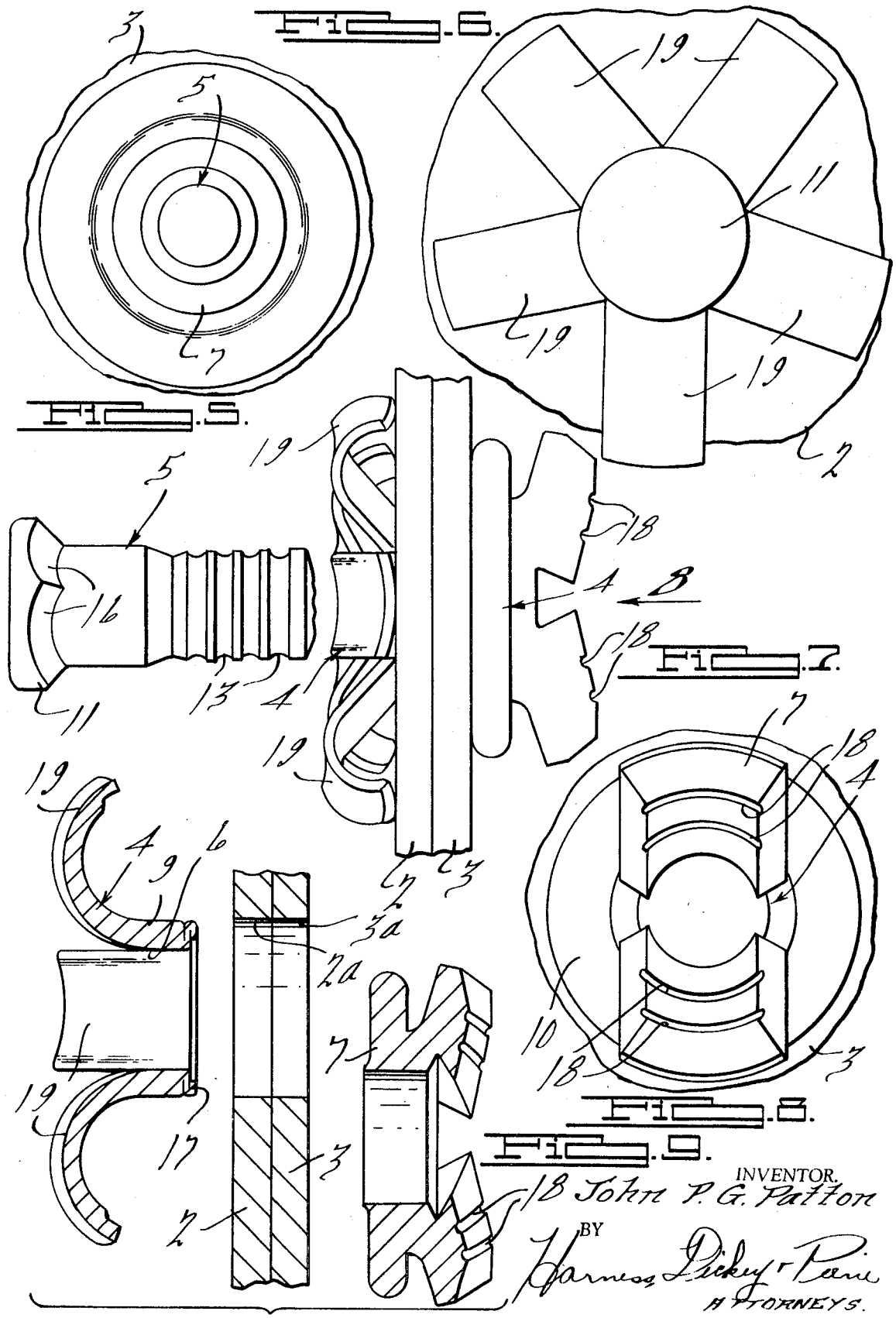

---

3,515,028
BLIND FASTENER
John P. G. Patton, Grosse Pointe Woods, Mich., assignor to Huck Manufacturing Company
Filed Mar. 21, 1969, Ser. No. 809,091
Int. Cl. F16b *13/04*
U.S. Cl. 85—77                                  3 Claims

ABSTRACT OF THE DISCLOSURE

A blind fastener constructed for both ready installation and removal which comprises a headed sleeve and pin assembled within the sleeve so constructed that the sleeve projects beyond the blind side of the parts being secured together, with the head of the sleeve on the outside so that upon relative movement between the pin and sleeve a blind head is formed on the blind side and the head of the sleeve is fixed to the pin on the accessible side and in which the wall of the sleeve adjacent the head is weakened so that when the fastener is set, the weakened section collapses without affecting the strength of the joint, but which facilitates removal of the fastener without injury to the hole.

---

This present invention relates to improvements in blind fastening devices and particularly to such devices in which the fastener is applied and pulled from one side of the work to secure together a plurality of overlapping or superimposed members and in which the opposite side of the work is inaccessible.

Generally, there is one type of two-part blind fastener which comprises a pin and a sleeve-like member. The sleeve-like member has a tubular portion of substantially uniform wall thickness throughout its length and terminating at one end with an integral head which has an adjacent diameter substantially greater than the outside diameter of the tubular portion of the sleeve. The pin has an enlarged head at one end wherein the head has an outside diameter substantially the same as the outside diameter of the tubular sleeve. The parts are assembled with the pin inserted through the sleeve and with the head abutting or close to the adjacent end of the sleeve.

The pin has a pulling portion which projects through and beyond the head of the sleeve and is adapted to be gripped by a known tool to pull the pin relative to the sleeve.

Cooperating means are provided between the head of the sleeve and that portion of the pin which underlies the head after the fastener is set so that the head and pin are interconnected to prevent longitudinal movement of the pin and thereby prevent accidental displacement of the pin after assembly.

In many of these types of blind fasteners the head of the pin has a portion shaped to cooperate with the adjacent end of the sleeve to form an additional head on the blind side of the structure.

In one prior art structure, the underside of the head of the pin is tapered so that when it is pulled relative to the sleeve, the end of the sleeve is caused to expand around the pin head in a tulip shape to form the blind head. At the same time the preformed head on the sleeve is swaged into locking grooves on the pin to secure the pin relative to the sleeve and the pulling portion of the pin is broken off at a breakneck in a known manner. Such a type of blind fastener is that shown in Reynolds Pat. No. 3,136,-204 granted June 9, 1964.

In another type of blind fastener, the sleeve is provided with notches and/or longitudinally extending weakened portions in the wall section or is provided with a solid wall section and the enlarged head of the pin is provided with cutting portions on the underside so that in both cases upon relative motion between the pin and the sleeve, the sleeve is caused to split in a plurality of petal-like parts which curl back against the sheet of the work. Such a blind fastener is the type disclosed in Looker Pat. No. 3,204,517 granted Sept. 7, 1965.

In both of these types, the underside of the head of the pin is generally conical in form, and when the fastener is finally set, such conical portion is firmly secured against the adjacent walls of the sleeve at the blind sheet side which contributes materially to giving the fastener its structural strength.

In the blind fasteners described above, the wall of the tubular portion of the sleeve is of uniform thickness throughout its length, except for the possibilities of weakened sections or counterbores which may be present in the free end of the sleeve to control the initiation of the formation of the blind side. In these blind structures, the portion of the sleeve within the openings of the parts being secured together adjacent the integral head on the sleeve is a full wall thickness so that this integral joint between the sleeve and the head completely fills the hole of the parts secured together.

The prior art devices described above are quite satisfactory in their application to the work and in providing the strength required. One of the serious problems of such fasteners results from the difficulty in removing the fasteners from the work. It is quite often desirable in assemblies and subassemblies, for example, where repairs are needed in automotive parts, to disassemble parts for the purpose of making such repairs.

The removal of the prior art devices requires that the head of the sleeve must be separated from interlocking engagement with the pin. This is not too difficult in itself because it merely requires the application of shears to the head of the sleeve which cut through and such segments may thereafter be pushed apart. The pin may then be knocked loose inwardly from the assembly. However, the tubular part must still be removed and the only known methods of removing have required that the sleeve be drilled or machined out and such drilling must be done to the extent of drilling out the entire wall thickness of the tubular portion within the openings. It has been found that this is not only a very slow and cumbersome process, but also that it is very difficult and rarely done without damage and enlargement to the surrounding hole. In some cases, drilling is impossible because the sleeve will spin in the hole causing damage to the sheet. Thus, the desirability of being able to reassemble using the original holes and obtain the original strengths is defeated.

One of the objects of the present invention is to so construct the blind fastener that it may readily be removable without the necessity of drilling and thereby the cost of such drilling or machining and the danger of damage to the hole is eliminated so that the fastener may be replaced by one of the same size.

This object is accomplished by forming a weakened section in the wall of the sleeve adjacent the head so that when the fastener is driven, the major portion of the sleeve will first collapse within the wall openings and the weakened section of the wall may either be completely disintegrated or will provide a very flimsy interconnection between the blind side of this sleeve within the hole and the head of the sleeve. The manner in which this is removed will be hereinafter described.

Referring to the drawings, one embodiment of the present invention is illustrated, and such embodiment is one of the forms disclosed in the above-identified Looker patent.

FIG. 1 is a side elevational view of the pin of the embodiment illustrated;

FIG. 2 is a cross-sectional view of the sleeve;

FIG. 3 is a cross-sectional view of the fastener assembly inserted within the panels before the fastener is set;

FIG. 4 is a view similar to FIG. 3 showing the fastener finally set;

FIG. 5 is an end elevational view taken in the direction of the arrow 5 of FIG. 4;

FIG. 6 is an end elevational view taken in the direction of arrow 6 of FIG. 4;

FIG. 7 is an elevational view of the assembly, but showing the assembly in its first stages of disassembly;

FIG. 8 is an end elevational view taken in the direction of arrow 8 of FIG. 7;

FIG. 9 is a cross-sectional view of the parts in their relation immediately after disassembly;

Referring to the drawings, the two-part blind fastener of the present invention is generally indicated at 1 and is adapted to pull together, if separated, and secure together sheet-like panel members 2 and 3 which have aligned openings 2a and 3a, respectively, preformed in the sheets.

The fastener 1 comprises a sleeve member generally indicated at 4 and a pin member generally indicated at 5. Such members 4 and 5 are formed of metal such as steel or aluminum or titanium or any of the metal alloys known for use in the fastener field.

The fastener is set by tools well known in the art which grip the projecting end of the pin and pull it relative to the sleeve after the parts are assembled as shown in FIG. 3 with a cooperating anvil which bears against the head of the sleeve and cause it to swage inwardly at the proper time and break the pin at its breakneck portion after the parts are assembled.

The sleeve 4 is formed with an axial opening 6 therethrough and terminates adjacent one end in an annular integral head 7. The head 7 is formed with an annular taper 8 adjacent one end which is engaged by the anvil of the rivet setting tool. As stated, such tools are well known and for purpose of illustration, may be of the form shown in Huck Pat. 2,114,493.

The sleeve 4 has an elongated tubular projection 9 at the opposite end of the head 7 which is preferably enlarged at its juncture with the tubular portion 9 to provide an annular flange 10.

The pin 5 has a preformed head 11 at one end and an elongated stem portion which projects through the opening 6 with the head 11 closely adjacent and nearly abutting against the end of the tubular projection 9 when the fastener parts are assembled as shown in FIG. 3.

The stem of the pin terminates at the end opposite to the head in a plurality of pull grooves 12. The stem also has annular locking grooves 13 formed therein adjacent to but spaced from the head 11 a predetermined distance with an immediate cylindrical portion. The pin is formed with a breakneck 14 of reduced diameter between the pull grooves 12 and the locking grooves 13. The pull grooves 12, locking grooves 13 and breakneck 14 are similar in function to the corresponding elements on the pin disclosed in the Looker patent above referred to.

The underside of the head adjacent the end of the tubular portion 9 is formed with a plurality of cutting edges 16 similar to those formed in the said Looker patent.

According to the present invention, the tubular portion of the sleeve at its juncture with the integral head is weakened by the provision of a thin wall 17. Such thin wall in the embodiment illustrated is formed by an annular concentric groove formed in the outside of the sleeve immediately adjacent the flange 10.

The fastener parts are assembled as shown in FIG. 3 with the pin 5 projecting through the bore 6 on the blind side of the panel 2 and with the pull grooves 12 projecting beyond the end of the sleeve head 7. The flange 10 overlies the opening 3a and the sleeve projects through opening 2a to the blind side of the assembly with the parts of the sleeve adjacent the head with the aligned openings 2a and 3a.

The pin head 11 is disposed adjacent the end of the sleeve indicated at 15 which is preferably of a slightly reduced diameter on its O.D. (shown in exaggeration in the drawing) which helps to get the slitting started properly. The pin is also disposed within the bore 6 with the cylindrical portion preferably within the sleeve with a press fit so that the parts after assembly will not become separated until put in use. In this position, the cutting edges 16 are closely adjacent the edge 15 of the projecting tubular portion 9 with the cutting edges 16 sloping outwardly.

The fastener is set by a known pulling tool which has a gripping means adapted to engage the pull grooves 12 and with an anvil bearing against the taper 8 on the head 7 which applies a reaction force thereagainst. As the pin 5 is pulled relative to the sleeve, the cutting edges 16 engage and cut into the inside edge of the tubular projection 9 and cause the projection 9 to progressively split into a plurality of fingers 19, there being as many fingers as cutting edges and in the embodiment illustrated, five. As the pull progresses, the slits in the walls of the sleeve progress causing the fingers to flair outwardly and reversely bend to the position shown in FIG. 4.

At the initial contact between the head 11 with the edge 15 of the sleeve, and before the slitting actually starts, the weakened wall section 17 will collapse and the adjacent full wall thickness of the sleeve will move through the openings 2a and 3a so that the openings 2a and 3a are filled by the sleeve and the adjacent end of the sleeve is close to or abutting against the adjacent flange 10 of the head 7, as shown in FIG. 4. The weakened section 17 may either break off in whole or in part or may remain interconnected with the head and the sleeve. In any event, the function of the fastener is not affected.

Since the anvil and the pull tool is applying a reaction force against the head 7, the conical underside of the head 11 is pulled tightly against the adjacent walls of the sleeve 4 which remains uncut, so that there is considerable pressure brought by the pin head against the sleeve and consequently against the adjacent openings of the panels. With the integral head bearing against the opposite side of the panels, the parts are securely pulled together and held together. Thus, with the head 11 reaching the portion adjacent the panel 2 as shown in FIG. 4, the adjacent metal in the sleeve 9 will be crowded against the panel 2 so that relative movement between the pin 5 and sleeve 4 will stop. Thereafter the anvil of the installation tool will move over the head 7 causing the metal of the head to flow into the locking grooves 13 and secure the fastener parts 4 and 5 relative to each other. When further movement of the anvil is prevented, the pull on the pin will reach such a force as to cause the pin to break at the breakneck 14 and the fastener will be finally set as shown in FIG. 4. When the metal of the head is forced into the locking grooves 13, complementary interlocking grooves 18 are formed in the head 7.

As stated above, it is frequently desirable to be able to remove the fasteners without injury to the panel openings for purposes such as disassembly for repair.

The fastener of the present invention is disassembled as shown in FIGS. 7, 8 and 9. Standard known shears or bolt cutters are applied to engage the head 7 and cut longitudinally through the walls of the head against the pin 5. Such cutters may then be moved sideways to cause the split portions of the sleeve to separate as shown in FIG. 7 which effects a separation between the interlocking grooves 13 and 18 of the pin and sleeve, respectively. This releases the pin from engagement with the sleeve and it may readily be knocked through the opening 6 of the sleeve by any suitable mechanism such as a smaller pin. The pin 5 will then drop away from the assembly.

In the prior art structures described above, the preformed head 7 of the sleeve and the blind head formed on the inside would still be securely held together by the uniform wall thickness of the tubular portion of the sleeve. This has necessitated the unsatisfactory drilling operation which would be required to drill away the entire wall thickness of the sleeve within the openings 2a and 3a, often with consequent damage to the holes 2a and 3a. However, with the present invention the weak and flimsy portion 17 may be very easily broken away by a simple wiggle of the shears or a slight hammer tap to separate the head 7 from the tubular portion 9 if they are not already separated and the parts will separate and fall away as shown in FIG. 9.

While preferred embodiments of the invention have been shown and described, it will be understood that various changes and modifications may be made without departing from the spirit of the invention.

What is claimed is:

1. A blind rivet comprising a sleeve formed of malleable material and a pin, said sleeve including a tubular portion terminating in a radially enlarged annular sleeve head at one end and having a central bore extending therethrough, said pin including a shank portion extending through said bore and terminating on the blind side of the sleeve by an integral, rigidly connected projecting pin head, said pin head having a conical portion adapted to engage the adjacent end of the tubular portion whereby the wall of the tubular portion is expanded outwardly as the pin head is moved through the central bore to form a blind head, said pin having pull means at the end opposite to the pin head and having a locking means in the form of annular grooves thereon between the pin head and the pull means adapted to be located substantially co-axially with the sleeve head, said sleeve head being plastically deformable into said locking means for securing the pin and sleeve together when the rivet is set, that portion of the sleeve adjacent the sleeve head being weakened by a reduction in cross-section so that it collapses when the rivet is set and the adjacent wall section of the sleeve moves to a position adjacent said sleeve head.

2. A blind rivet according to claim 1, in which the weakened portion of the sleve is formed by an annular groove in the wall of the sleeve.

3. A blind rivet according to claim 2, in which the annular groove is external.

References Cited

UNITED STATES PATENTS

| 2,324,142 | 7/1943 | Eklund | 85—70 X |
| 3,204,517 | 9/1965 | Looker | 85—77 |
| 3,286,580 | 11/1966 | Jeal | 85—77 |

FOREIGN PATENTS

| 344,832 | 4/1960 | Switzerland. |

RAMON S. BRITTS, Primary Examiner